United States Patent
Eikrem et al.

(10) Patent No.: US 6,273,639 B1
(45) Date of Patent: Aug. 14, 2001

(54) METHOD AND APPARATUS FOR FACILITATING MIGRATION OF FISH PAST DAMS AND OTHER BARRIERS IN WATERWAYS

(76) Inventors: Webjorn Eikrem, 19975 NE. 154th St., Woodinville, WA (US) 98072; Bjarne Fjorstad, P.O. Box 77, 6200 Stranda (NO)

( * ) Notice: Subject to any disclaimer, the term of this patent is extended or adjusted under 35 U.S.C. 154(b) by 0 days.

(21) Appl. No.: 09/447,534

(22) Filed: Nov. 23, 1999

Related U.S. Application Data (60) Provisional application No. 60/156,983, filed on Oct. 1, 1999.

(51) Int. Cl.[7] ............................... E02B 8/08; E02B 7/20; A01K 63/02
(52) U.S. Cl. ............................... 405/83; 405/81; 405/87; 405/92; 119/203; 119/219; 137/247.15; 137/247.17
(58) Field of Search .................................. 405/81, 82, 83, 405/87, 92; 119/203, 219; 137/247.15, 247.17, 455, 635, 637

(56) References Cited

U.S. PATENT DOCUMENTS

| | | | | |
|---|---|---|---|---|
| 1,380,384 | * | 6/1921 | Howard | 405/81 |
| 1,722,596 | * | 7/1929 | Ross | 405/81 |
| 2,121,968 | * | 6/1938 | Kuehl | 405/81 |
| 3,232,060 | | 2/1966 | Windle | 61/21 |
| 3,596,468 | | 8/1971 | Fairbanks | 61/21 |
| 3,772,891 | * | 11/1973 | Raistakka | 61/21 |
| 4,034,331 | | 7/1977 | Menin et al. | 340/3 R |
| 4,070,616 | * | 1/1978 | Kristinsson | 324/65 R |
| 4,260,286 | | 4/1981 | Buchanan | 405/82 |
| 4,437,431 | | 3/1984 | Koch | 119/3 |
| 4,629,361 | | 12/1986 | Zimmerman | 405/83 |
| 4,904,114 | * | 2/1990 | Warner et al. | 405/82 |
| 4,929,122 | | 5/1990 | Yoas | 405/81 |
| 5,139,364 | | 8/1992 | Takahashi et al. | 405/81 |
| 5,161,913 | | 11/1992 | Boylan | 405/83 |
| 5,433,554 | * | 7/1995 | Minakami et al. | 405/81 |
| 5,660,499 | | 8/1997 | Bethune | 405/83 |
| 6,038,494 | * | 3/2000 | Fisher, Jr. et al. | 700/287 |

FOREIGN PATENT DOCUMENTS 179147    8/1996  (NO) .

* cited by examiner

Primary Examiner—Thomas B. Will
Assistant Examiner—Gary S. Hartmann
(74) Attorney, Agent, or Firm—Garrison & Associates PS; David L. Garrison

(57) ABSTRACT

Method and apparatus for fish migration past dams and other water barriers. A preferred embodiment 100 comprises a conduit 101 passing from downstream side 22 of water barrier 10 to upstream side 21 of the barrier, flow-controlling valves 102 and 105 disposed in series within conduit 101, and actuators 103 for opening valves 102 and 105 in the presence of fish. Fish 30 are attracted by flow 130 passing through conduit 101 at controlled rates by means of flow-through devices in valves 102 and 105. On entering fore-chamber 104 and swimming upstream the fish pass actuators 103, which cause first valve 102 to open. As first valve 102 opens, water flow through conduit 101 remains controlled and substantially uniformly turbulent under action of second valve 105. With valve 102 open fish 30 may swim to mid-span section 140 of the conduit. When no further fish are present in forechamber 104 or passing actuators 103, or enough fish are present in section 140, the first valve closes. With valve 102 closed and fish passing actuators 103 in the direction of valve 105 in mid-span section 140, valve 105 opens. As valve 105 opens flow 130 through the conduit is controlled by now closed valve 102. Upon opening of valve 105 fish 31 are free to swim past valve 105 and exit conduit 101 through sally port 141, and to swim away from barrier 10 into upstream side 21 of waterway 20. Expanded sections 180 of conduit 101 are provided as rest stations for long transits against strong currents.

16 Claims, 6 Drawing Sheets

METHOD AND APPARATUS FOR FACILITATING MIGRATION OF FISH PAST DAMS AND OTHER BARRIERS IN WATERWAYS

This application claims the benefit of U.S. provisional patent application Ser. No. 60/156,983, entitled Method and Apparatus for Facilitating Migration of Fish Past Dams and Other Barriers in Waterways and filed Oct. 1, 1999.

TECHNICAL FIELD

The invention relates to methods and apparatus for facilitating the migration of fish past dams and other obstacles in waterways. More particularly, it relates to conduits adapted for installation in dams and the like, comprising one or more gate valves for accommodating the up-or downstream migration of fish.

BACKGROUND OF THE INVENTION

Fish ladders have long been used to allow fish to migrate past dams and other obstacles in waterways, in order to permit completion of their life cycle and ensure perpetuation of them as species. The most typical and well known device for allowing fish migration has been the use of artificial ponds stepped between a lower, downstream side of a dam and an upper, upstream side, so arranged that water continuously spilled over the tops of the ponds attracts fish and permits them to swim and jump upstream against a current, as fish are wont to do. Ponds of this type, however, must be specially fabricated at each individual cite, due to the unique geography and geometry of each stream/dam combination, and their construction is materials-intensive, so they are expensive to build. Moreover, because the water spilled over the tops of the ponds must run at a constant rate in order to ensure that any fish which are attracted to the ladder are enabled to swim up it, such ladders can be profligate in their release of water which would otherwise remain reserved behind the dam. This leads to loss of undesirably large amounts of water as a valuable stored resource which might otherwise be put to use for drinking, irrigation, power generation, etc. In addition, stepped-pond ladders must typically be installed at the sides of the stream and dam in which they are located, so that insufficient space is available for the passage of fish at peak season, especially on larger rivers or where large migrations occur.

Other solutions have been offered. Among the most promising are those which provide conduits for the fish to use in passing through the stream obstruction, such as the system described in Norwegian patent 179147. However, even such devices are open to improvements of the type described herein.

For example, U.S. Pat. No. 3,596,468 to Fairbanks provides a conduit-type fish ladder. But flow through the conduit is controlled by valves which have single large openings, so that water under full pressure caused by the head between the upper surface of the water way and the valve itself is allowed to pass when the valve is open. This results in a relatively large, high-pressure stream into which the fish are required to swim. The resultant concentrated, turbulent, high pressure stream is often difficult and sometimes impossible for fish to fight, and many of them die in the struggle, or are so tired by the process that they are swept back to the lower end of the conduit and must try again or give up.

Similarly, the valves provided in U.S. Pat. No. 3,232,060 to Windle provide an option of two relatively large holes or a fully opened valve for the fish to combat. In either case very strong, concentrated flows result which are too powerful for fish to fight.

DISCLOSURE OF THE INVENTION

Accordingly, it is an object of the invention to provide improved method and apparatus for facilitating migration of fish past dams and other barriers in waterways, including valves which provide a relatively reduced fluid flow, with resultant controlled flow rates and relatively uniform turbulence in portions of the fishway downstream from the valves. It is also an object of the invention to provide fishways which provide opportunities for migratory fish to rest on their journey through the fishway, so that a greater number of fish are able to complete migration past the water barrier.

In one aspect the invention provides apparatus for facilitating migration of fish past dams and other barriers in waterways. The apparatus comprises a conduit passing from a downstream side of a water barrier to an upstream side of said barrier, to provide a pathway for migrating fish; at least one flow-controlling valve disposed within the conduit; and at least one actuator for opening said valve in the presence of fish. The invention is suitable for use in facilitating migration past with dams, waterfalls, and any other otherwise difficult or impassable barriers for fish.

Flow controlling valves suitable for use with this aspect of the invention are of many suitable forms. Their primary function is to stop or reduce flow of water from the upstream side to the downstream side of the water barrier through the conduit while closed, so as to reduce flow through the conduit (if necessary) to a rate and pressure at which fish are able to swim into it, and to permit passage of fish through the conduit while open. An important aspect of the function provided by such flow controlling valves is to provide a substantially uniform flow past the valve and through the conduit. As has been mentioned, prior art valves have provided one or sometimes two relatively large openings, which produce relatively concentrated and turbulent flows within the conduit; these currents are difficult for fish to fight. Gate valves comprising three or more substantially uniformly sized and spaced holes, and preferably more, have been found to work satisfactorily. In general, a relatively large number of small holes, substantially uniformly distributed across the valve, have been found to give the best results—the difference between such configurations and valves providing only one or two large holes being compared to the difference between a strong stream from an open hose and the more gentle, uniform stream of the same flow rate issued from a shower head. Any valves adaptable to the uses and purposes described herein will serve. Examples of suitable valves include gate valves and ball valves. Such valves may be adapted for use with the apparatus aspect of the invention by placing holes or openings in the valve body, as described, such that when the valve is placed in the flow-reducing condition—that is, when the gate plate is placed to block the conduit—some relatively reduced, relatively uniformly turbulent flow of water continues to pass through the valve, and then through the conduit (so as, among other purposes, to attract fish to swim upstream through the conduit). Ball valves may be similarly adapted by placing a number of relatively smaller secondary channels through the valve body in a direction more or less perpendicular to that of the primary valve channel, so that when the valve body is turned into a direction in which the primary channel is closed, the smaller or secondary channels are opened and permit a relatively reduced flow of water through the valve; opening of the valve, as in the case of the gate valve, permits passage of fish through the portion of the conduit in which the valve is placed.

Another means for providing continuous flow through the conduit in the apparatus aspect of the invention is to provide one or more bypass conduits around valves present in the main or primary conduit. This alternative is particularly advantageous in embodiments of the invention in which the flow controlling valve fully blocks the primary conduit, as where no holes or secondary channels are provided in gate or ball valves. The use of a number of relatively small bypass conduits provides flow patterns and results similar to those described for gate and ball valves above.

Preferred embodiments of the apparatus aspect of the invention comprise a plurality of flow controlling valves, or valve sets, serially disposed within the primary migration conduit (that is, placed within the conduit in series) so that one or more of the valves or valve sets may be opened without raising the rate of flow of water through the valve to an undesirably high level. For example, having more than one flow controlling valve can permit the opening of one valve to allow passage of fish without causing water to rush through the conduit at the full capacity of the primary conduit, possibly at so high a rate that fish are unable to complete passage through the conduit to the other side of the water barrier. Where large differences exist between water levels on the upstream and downstream sides of the water barrier, a plurality of flow controlling valves can be used advantageously to reduce pressures resisted by individual valves.

In preferred embodiments of the apparatus aspect of the invention the flow controlling valve (or valves) is operated automatically when fish are present, and generally when they are within a selected distance from the valve. Thus as fish approach the valve the valve opens to facilitate their passage. A wide variety of automatic opening mechanisms are available for providing the valves with this capability. For example, photocells, pressure gages, motion detectors, cameras, flow meters, and clocks are all well known in the art of providing automatically activated or opening doors, valves, and the like, and each is suitable for use as sensors with this aspect of the invention. Linked with suitable mechanical, electrical, or electromechanical devices to an opening engine, any one or more of these types of sensors can be used to automatically open and close a valve. Any one or more of any these types of sensors or devices may be placed at a suitable distance or sequence on either the upstream or downstream side of a valve, so that fish approaching the valve cause, for example, fluctuations in light entering a photocell, or in pressure across a pressure gage, or in flow rates, or other suitable indications so that the sensing device gives a suitable signal to the gate-opening engine and causes the gate to open. Likewise, simple clocks can be used to open gates at preset times or intervals. It can be especially advantageous to use combinations of different types of sensors, in order to provide further assurance of proper functioning of the system. The design of automatic gate-opening apparatus for use with the apparatus aspect of the invention will not trouble the designer of ordinary skill in the art once he or she has had an opportunity to review this disclosure.

A particularly useful aspect of the invention is the provision of rest stations along the length of the conduit. It is well known that one problem associated with relatively long fish passage conduits, and particularly those in which flow rates and pressures are high, is that fish attempting to migrate through the conduits tire and are unable to complete the journey. Thus it is found to be advantageous to provide the conduits of the invention with one or more rest stations. Generally such rest stations consist of enlarged sections of the conduit. By increasing the effective diameter or cross-sectional area of the conduit a reduced flow rate may be produced within the enlarged section. This benefit is especially pronounced when the enlargement of the conduit is offset from the axis of the conduit, so that a portion of the enlarged section is out of the main flow stream through the conduit. The size of the enlargement relative to other portions of the conduit depends upon the pressures and flow rates within the conduit and the types of fish to be encouraged to migrate through the conduit. For salmon and similar fish, for example, provided with a one-meter circular conduit subjected to approximately a 15 meter head of pressure, a circular offset enlargement two meters in diameter and approximately 3 meters long has been found to serve well. It has also been found in such circumstances that it is advantageous to dispose rest stations within the conduit at about 5 to 20 meter intervals, and preferably about every 7 or 8 meters along the length of the conduit. The selection of sizes of conduits and rest stations, and suitable spacing for rest stations, for selected fish migrations and water barriers will be a matter well within the scope of the ordinary designer of such systems, once he or she has been armed with this disclosure.

In many circumstances, particularly in dam installations where migration of large or widely-varying numbers of fish are present or anticipated, it is advantageous to install more than one migration apparatus according to the invention. In such cases two or more primary conduits, each with an appropriate number of associated flow-controlling valves, rest stations, and other devices, may be installed. Such apparatus generally comprise a plurality of conduits passing from a downstream side of a water barrier to an upstream side of said barrier; a plurality of gate valves serially disposed within each said conduit; at least one actuator for automatically opening said each of said valves in the presence of fish, said actuator chosen from the group consisting of photocells, pressure gages, cameras, flow meters, other motion detectors, and clocks; and flow through apparatus for maintaining a flow of water through said each said conduit when at least one of said gate valves within said conduit is closed.

A particular advantage of the apparatus aspect of the invention is that it is readily adapted, as will be appreciated by those having skill in the art, for use in conjunction with other types of fish ladders or other devices for facilitating fish migrations. For example, an upper pond of a multi-pond fish ladder of the type described above is readily adaptable for use as an entrance to the primary migration conduit of the invention.

In another aspect the invention provides a method of facilitating migration of fish past dams and other barriers in waterways. In general the method comprises the steps of providing a flow of water at an end of a conduit passing from a downstream side of a water barrier to an upstream side of the barrier, to attract fish into entering the conduit; opening a first valve in the conduit to permit passage of at least one of the fish by the first valve; closing the first valve; and opening a second valve located in the conduit at a distance from the first valve, to permit at least one of the fish to pass the second valve and continue through the conduit. Optionally the method further comprises steps associated with use and operation of the apparatus described herein.

An optional but highly advantageous feature of the invention is the provision of a shelter above the entrance to the downstream side of the migration conduit. This conduit shelters the entrance to the conduit, or most often the surface of the water above the conduit, from sun, wind, and weather. Sheltering the entrance to the conduit has been found to increase the attractiveness of the conduit entrance to fish, and to encourage them to start the migration past the water barrier. The shelter may be of any length suitable for providing a measure of protection to the entrance of the conduit, and the selection of actual dimensions for it will be a matter well within the ability of those having an ordinary familiarity with the art of building migrational devices. In installations involving conduits of approximately one meter in diameter, the shelter extends outward away from the entrance for some substantial fraction or multiplicand of the diameter of the shelter, and preferably extends laterally along the face of the water barrier for a distance sufficient to cover the entire width of the conduit entrance.

Methods and apparatus for facilitating fish migration according to the invention permit fish to swim in either direction, upstream or downstream, across water barriers such as dams, waterfalls and the like. Apparatus according to the invention may be installed singly or in multiples, depending upon the geometry and geography of the barrier and the installation site, the costs of particular materials used in construction, the numbers and grouping sizes of migratory fish expected, and other factors which will be apparent to those familiar with the art. By appropriate sizing and use of suitable materials, as will occur to those of ordinary skill in the art of designing such systems, fish migration apparatus according to the invention can be made to function effectively regardless of head pressure differential—that is, the difference in water levels on the upstream and downstream sides of the barrier—using the principles disclosed herein and basic hydrodynamic principles such as are otherwise well known. They are easier and less expensive to install and operate, and more efficient in their use of power and water, than prior art devices; and they are not harmful to the environment.

In addition to the methods and apparatus for facilitating fish migration described herein, as such, it is to be understood that all new and useful devices or components described herein are considered to constitute a part of the invention, claimable in their own right, whether such is stated with particularity herein or not.

BEST MODE OF CARRYING OUT THE INVENTION

Turning now to the drawings, the invention will be described in a preferred embodiment by reference to the numerals of the drawing figures wherein like numbers indicate like parts.

Figure 1:
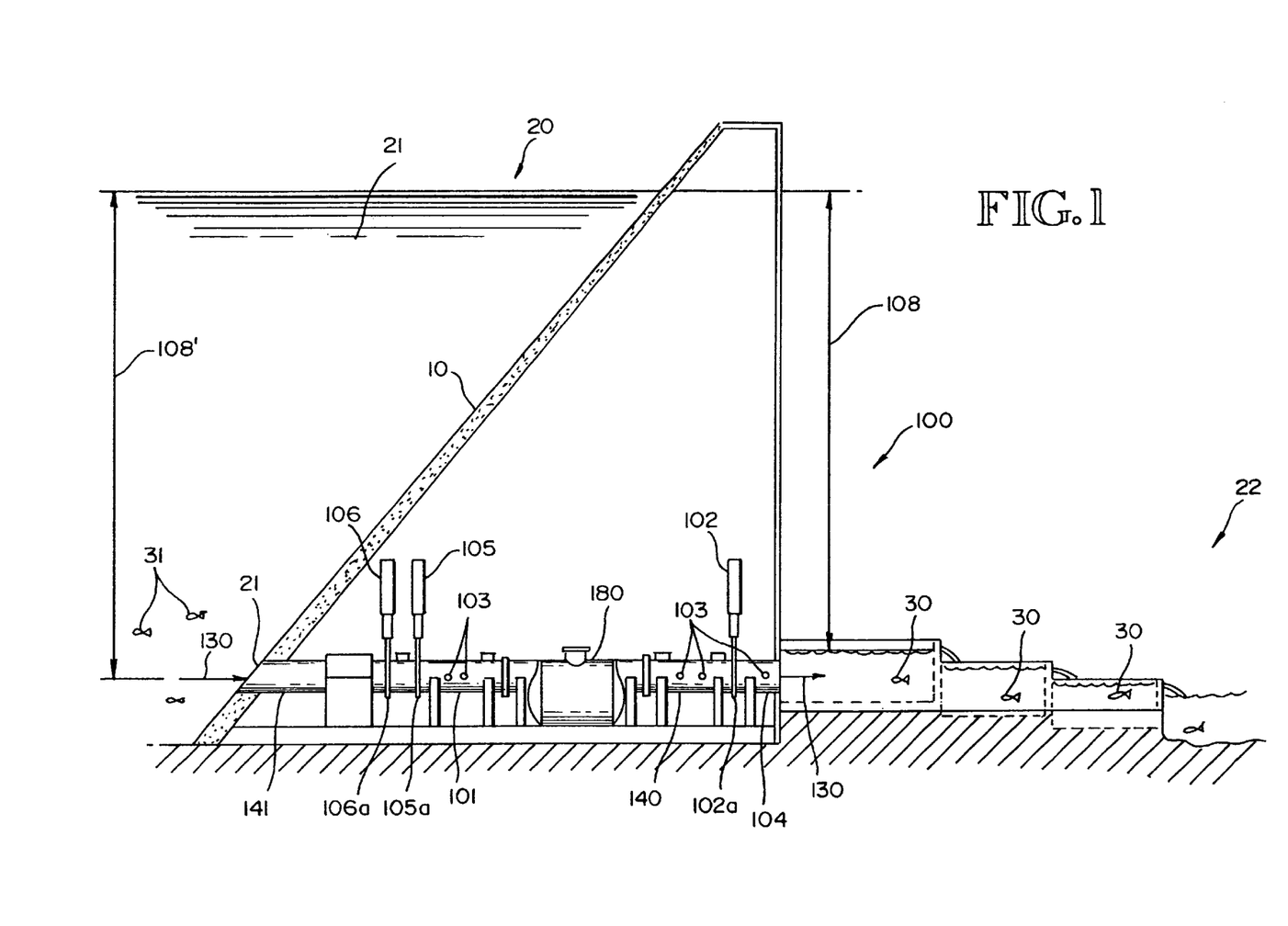
FIG. 1 is a schematic sectional view of a preferred apparatus for facilitating fish migration according to the invention.

FIG. 1 is a schematic sectional view of a preferred apparatus for facilitating fish migration according to the invention. Apparatus 100 comprises conduit 101 passing from downstream side 22 of water barrier 10 to upstream side 21 of the barrier, flow-controlling valves 102, 105, and 106 disposed in series within conduit 101, and actuators 103 for opening valves 102, 105, and 106 in the presence of fish 30, 31. Fish 30, attracted by flow 130 passing through conduit 101 by means of flow-through devices in valves 102, 105, and 106 as herein described, enter forechamber 104 of conduit 101 and pass actuators 103, which are either automatically controlled or controlled by means of control panel 116 (FIG. 3) and control apparatus 131 to open first valve 102. As first valve 102 opens, water flow through conduit 101 remains controlled, due to the effect of valves 105 and/or 106. (It should be noted in this connection that variations in flow are advantageous in some circumstances and may be achieved by appropriate adaptation of flow through devices, as shown in FIG. 4.) When valve 102 is open fish 30 may swim past it into mid-span section 140 of conduit 101. When no further fish are present in forechamber 104, or when a predetermined amount of time has passed or enough fish have accumulated in mid-span section 140, first valve closes. (Note in this regard that it is both advantageous and simple with known means to adapt actuators 103 to prevent either of valves 102 or 105 from closing when any fish are endangered by the closing process.) Also shown in FIG. 1 are rest stations 180, sections of conduit 101 with increased cross-sectional areas relative to the rest of the conduit. Effective enlargement of the diameters or cross-sectional areas of rest stations 180 reduces average fluid flow rates and pressures through the rest stations, affording fish opportunity to rest while fighting currents 130 within the conduit. In the embodiment shown in the figure rest stations 180 are offset from the centerline of fluid conduit 101 (which happens to be substantially coincident with flow reference arrow 130), so that in the lower portions of the rest station a relatively further decreased flow rate is present, allowing excellent rest opportunities for migrating fish. Alternatively rest stations 180 might be concentrically aligned with the conduit (see rest stations 181 of FIG. 2), or otherwise configured. With valve 102 closed and fish passing actuators 103 in the direction of valve 105 in mid-span section 140, valve 105 opens, either automatically or under direction from a control panel. As valve 105 opens flow 130 through the conduit is controlled by closed valve 102 and its associated flow-through apparatus. With valve 105 open fish 31 are free to swim past valve 105 and exit conduit 101 through sally port 141, and to swim away from barrier 10 into upstream side 21 of waterway 20.

An alternative configuration, which is very useful, is to provide one valve—particularly in embodiments including three or more valves—to shut flow in conduit 101 off completely. This is useful, for example, to conserve water during periods of reduced migratory activity. For example, in FIG. 1 either of valves 105 or 106 might be provided with a solid plate or gate, so that when the valve is shut flow within conduit 101 stops completely.

Figure 2:
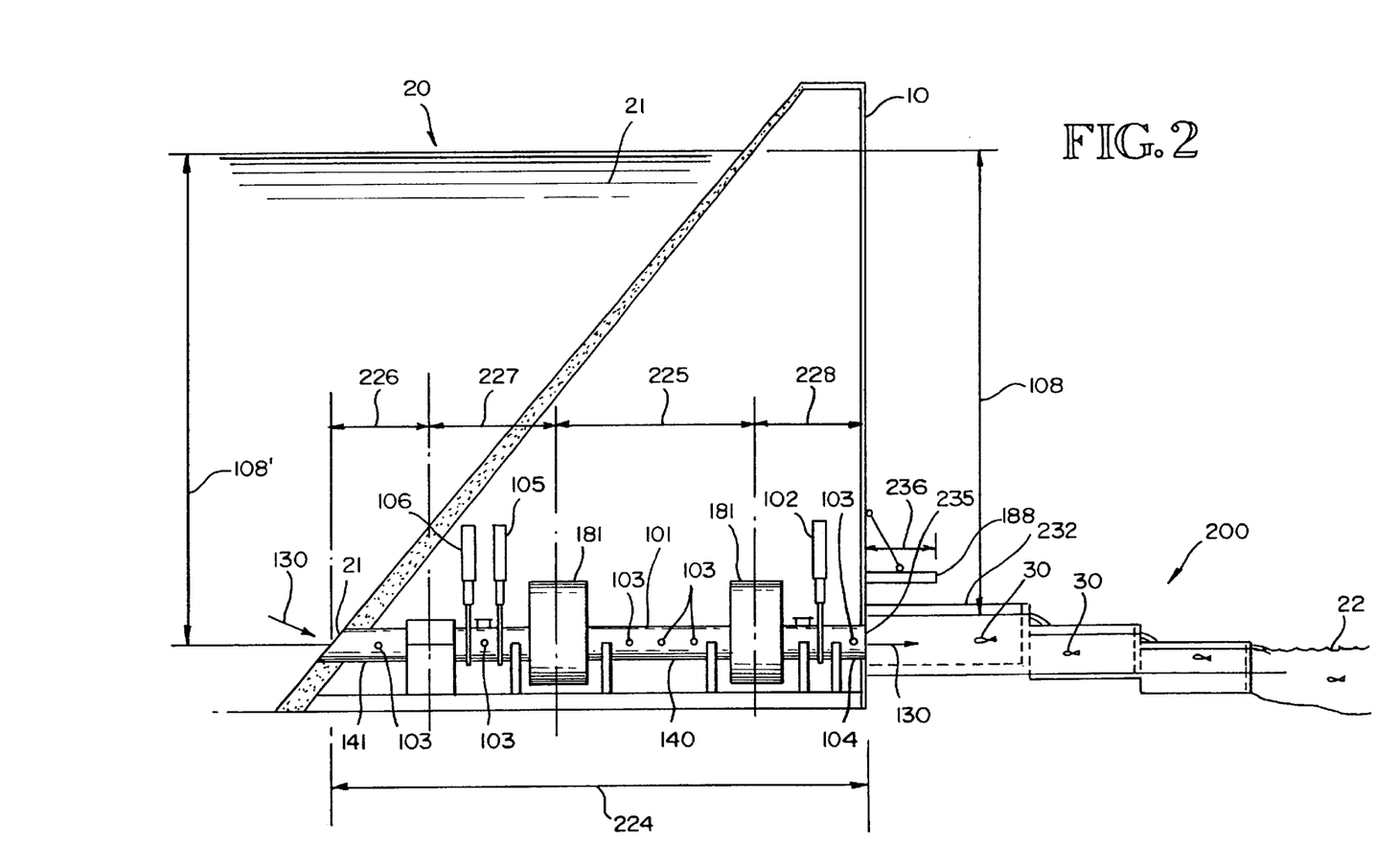
FIG. 2 is a schematic sectional view of a preferred apparatus for facilitating fish migration according to the invention.

In FIG. 2 a three-valve configuration of the invention is depicted, used in conjunction with prior-art style steppedpool ladder 200. FIG. 2 also depicts what is meant by the term head 108, which is the difference between the level of upstream side 21 of waterway 20 and downstream side 22 thereof. Head 108' between surface 21 and sally port 141 is also shown. Conduit 101 of FIG. 2 is of length 224 and comprises three rest stations 180 and 181. Rest stations 180 and 181 are spaced apart from each other by distances 225 and 227, and are located distances 226 and 228 from the ends of the conduit. In preferred embodiments of the invention lengths or distances 225, 226, 227, and 228 are 20 meters or less, and preferably not more than 8 meters, as herein discussed. Also shown in FIG. 2 is shelter 188 which covers the surface of water 22 downstream of the water barrier in a position above entrance 235 of conduit 111. Shelter 188 comprises a length 236, and a lateral width (not shown) across the face of the water barrier, sufficient to provide effective shelter above entrance 235 of conduit 101. What constitutes effective dimensions for the shelter will depend upon the conditions of flow, weather, and the like at the particular installation, and the species of fish to be attracted to the conduit; but the selection of appropriate dimensions for the shelter will be a matter well within the scope of the ordinary designer of such systems, once he or she is familiar with the disclosure herein, or require any onerous or even significant experimentation to determine. In configurations using shelter 188 in conjunction with conventional pond-type fish ladders such as ladder 232 in FIG. 2, it is important not to block access to any of the individual ladder ponds with the shelter. Thus typically shelter 188 will not extend outward so far to the limits of the uppermost pond of the ladder, or lie low enough to the surface of such pond, to block any significant access by fish to the uppermost pond.

Figure 3:
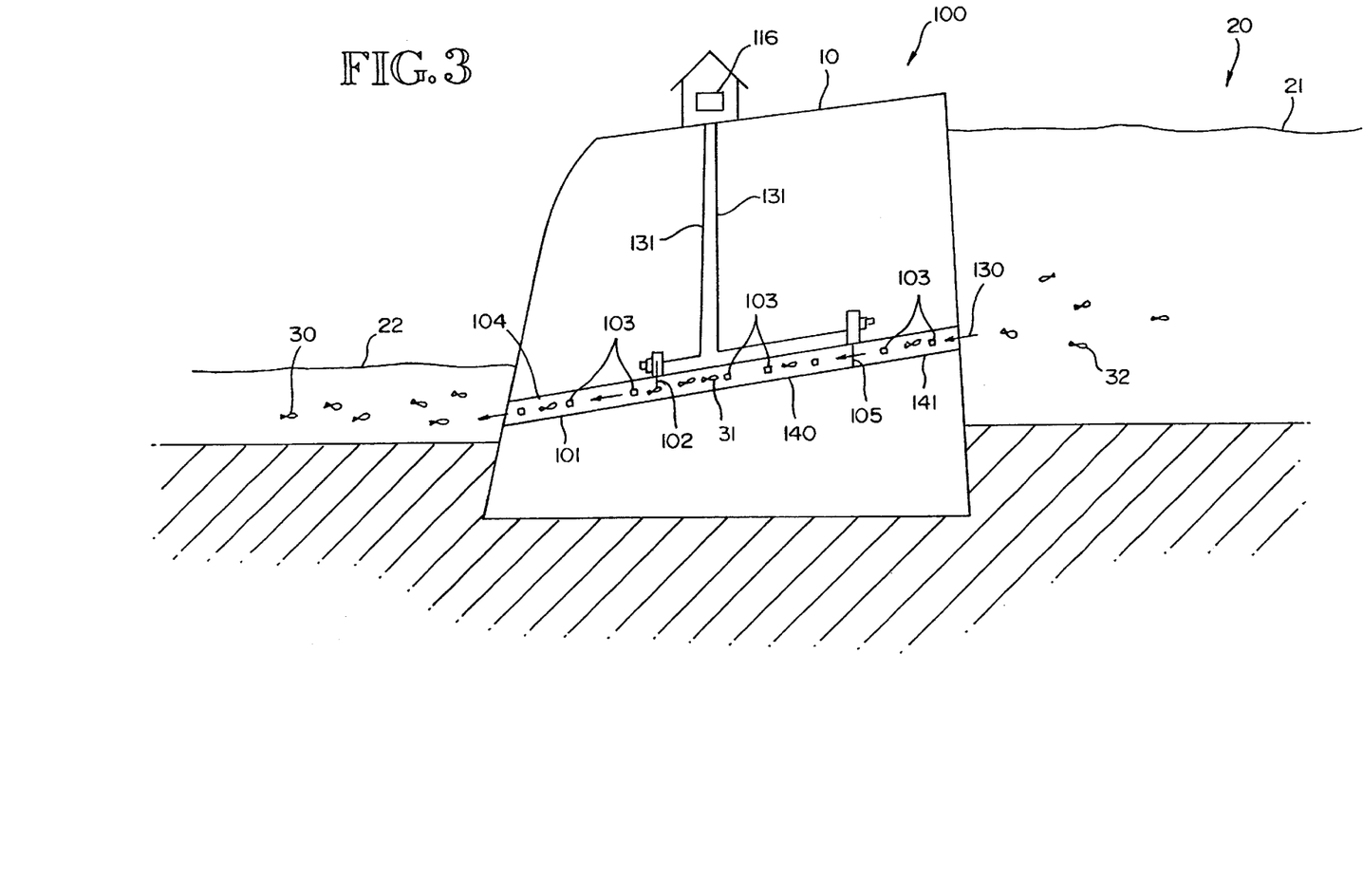
FIG. 3 is a schematic sectional view of a preferred apparatus for facilitating fish migration according to the invention.
Figure 4A:
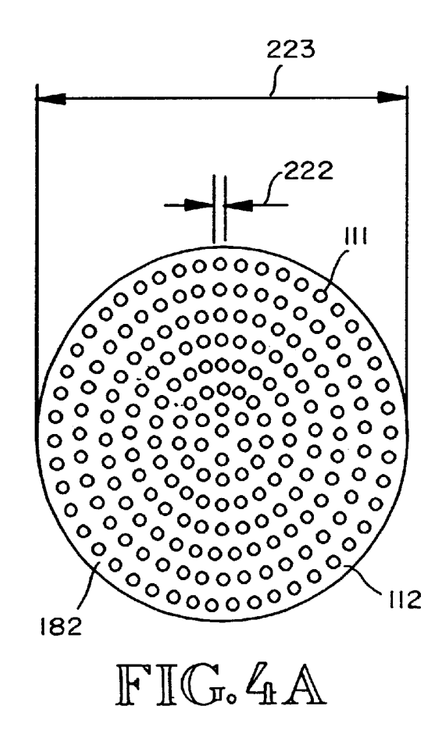
FIG. 4 is a schematic front view of a preferred embodiment of a flow-controlling valve according to the invention.
Figure 4B:
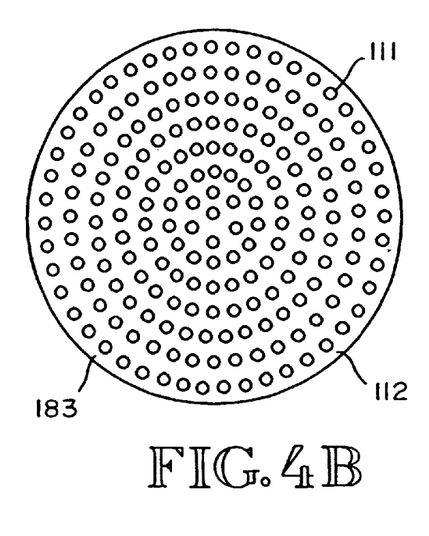
Figure 4C:
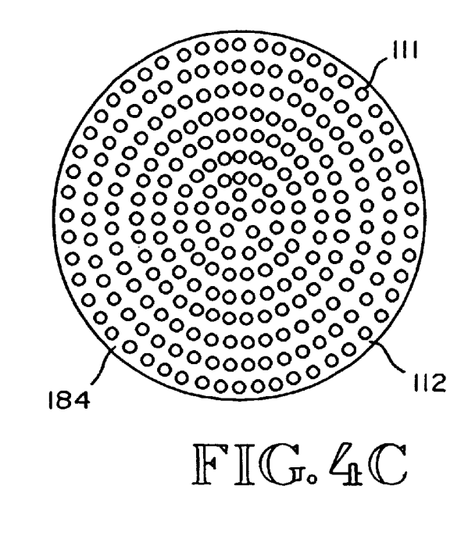

FIG. 3 depicts a 2-valve embodiment of the invention.

FIG. 4 depicts several gate members for gate valve embodiments of flow-controlling valves 102, 105, and 106. Valve gates 182, 183, and 184 comprise flow-through apparatus 112 in the form of a plurality of holes 111. The size, number, and spacing of holes 111 are selected in accordance with known hydrodynamic principles, as will be apparent to those of ordinary skill in the art, to provide a desired flow and flow rate of water through the conduit for any given head 108, as shown in FIG. 2. In order to provide substantial flow reduction, the aggregated areas of holes 111 is significantly smaller than the cross-sectional area of the conduit 101 in which the valves are installed. Although it is generally preferable to use gate valves providing substantially equal flow-through, it is possible and in some instances advantageous to provide a valve 102, say, which provides a given flow rate, a valve 105 which provides a different flow rate, and/or a valve 106 which provides yet another flow rate.

Figure 7:
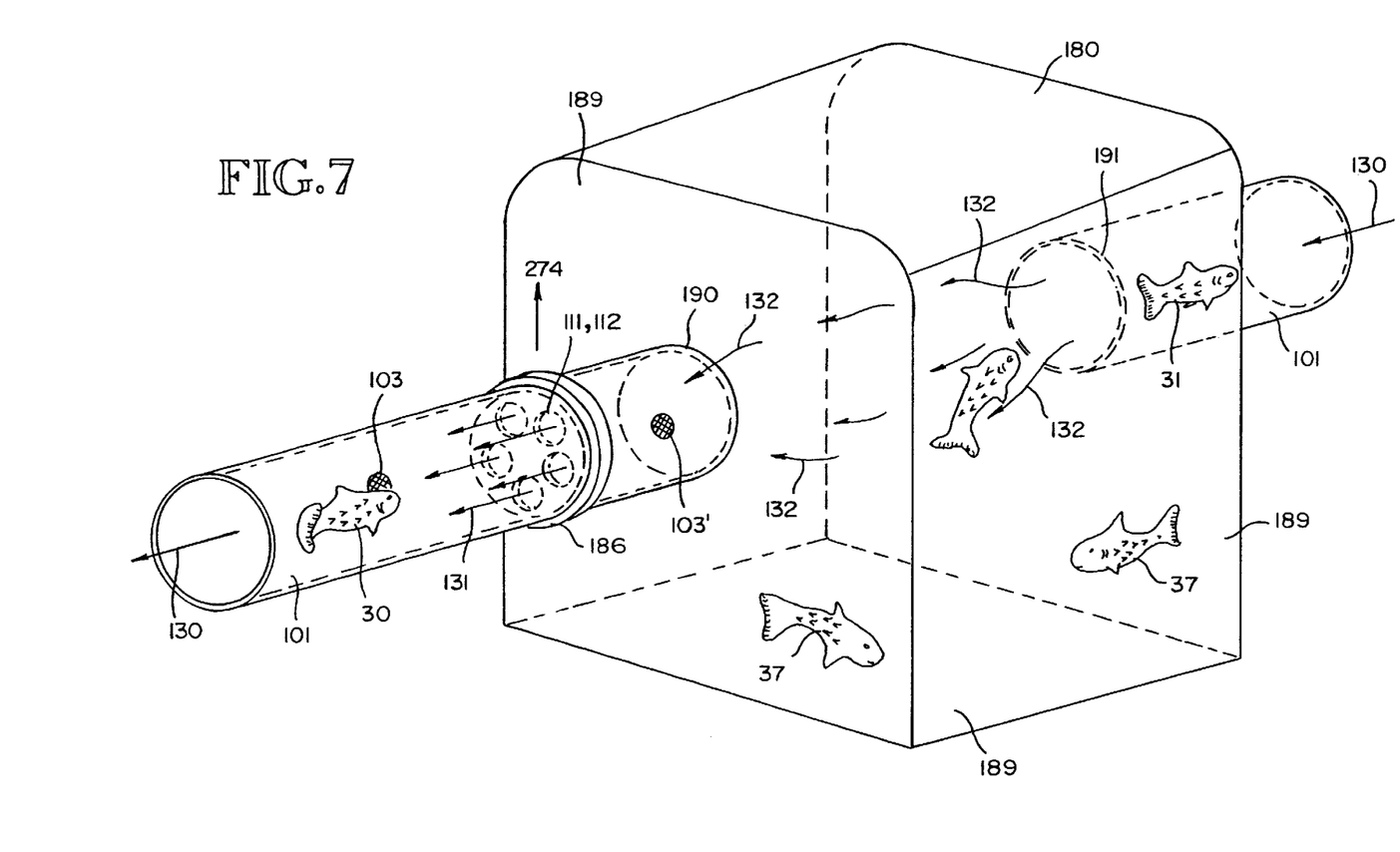
FIG. 7 is a partial schematic perspective view of an embodiment of a preferred apparatus for facilitating fish migration according to the invention.

Operation of a gate valve embodiment of a flow-controlling is depicted in FIG. 7. A portion of conduit 101 comprises gate 186 of a gate valve. Gate 186 is in a closed position in which it restricts or otherwise controls flow within the conduit, so that flow 130 from the upstream to the downstream side of a water barrier results. As fish 30 approaches gate 186, passing motion detector 103', gate 186 is opened by suitable means so that it withdraws from blocking conduit 101 in the direction of arrow 274. As fish 30 passes gate 186 and by motion detector 103, gate 186 is closed. As flow 130, which is lower than a flow which could be accommodated by conduit 101 with gate 186 in the open position (and no other flow-controlling gates operating upstream or downstream of gate 186 in conduit 101) passes through holes 111 in gate 182, it is split into a plurality of smaller, substantially uniform, distributed flows 131 of substantially uniformly turbulence.

After passing gate 186 in FIG. 7, fish 30 enter rest station 180 in which flow 130, having a larger effective conduit through which to pass, is slowed to a lower average velocity than that produced within conduit 101. The velocity of flow 132 within the rest station is in general reduced to particularly low relative rates in regions 189 within rest station 180 which are relatively remote from exits and entrances 190 and 191. In the reduced velocity flow conditions within the rest station fish 37 are able to rest before proceeding upstream against flow 130 in the further end of conduit 101.

Figure 5:
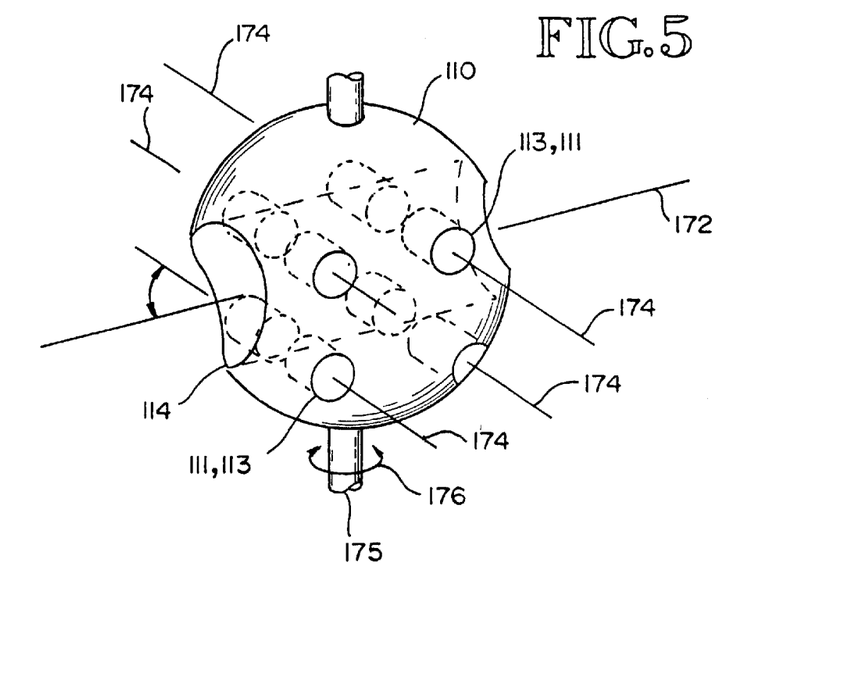
FIG. 5 is a schematic perspective view of an alternative preferred embodiment of a flow-controlling valve according to the invention.

FIG. 5 depicts a ball valve embodiment of a flow-controlling valve 102, 105, or 106. Ball valve 110 comprises primary channel 114, which is sized to provide a maximum desired flow through conduit 101 when the valve is in the open position, and secondary channels 113, which are oriented more or less perpendicularly to main channel 114 (as shown by angle 171 between primary channel axis 172 and secondary channel axis 174) and are sized to provide a desired flow-through rate, in accordance with hydrodynamic principles to achieve the effects described herein. Valve 110 is rotated between an opened and a closed (or flow-restricting) position by rotation about pin or axle 175 in the directions of arrow 176.

Figure 6:
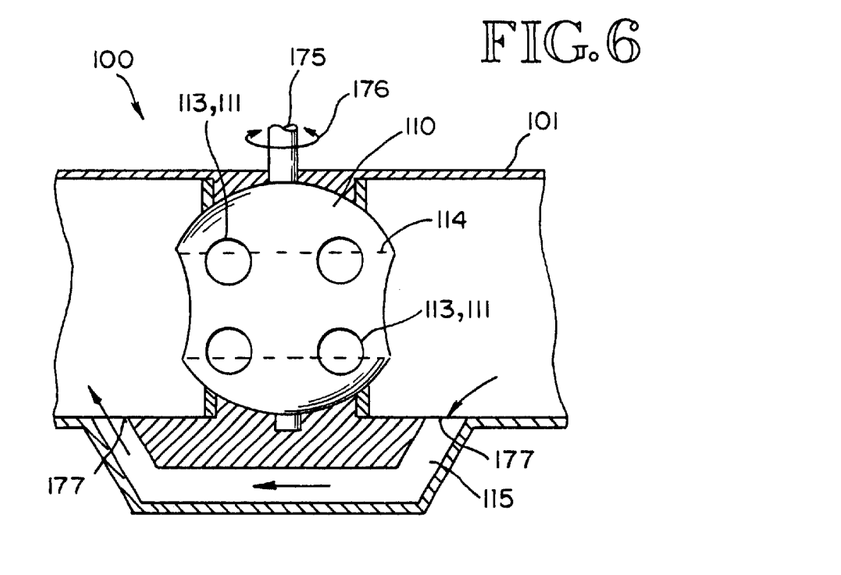
FIG. 6 is a schematic sectional view of an alternative embodiment of a flow-through apparatus according to the invention.

In FIG. 6 a water bypass conduit for use in conjunction with the apparatus aspect of the invention is depicted. Apparatus 100 (partially shown) comprises bypass conduit 115, through which flow is permitted around ball valve 110 (shown in the open position) when the valve 110 is closed. Fish are prevented from trying to swim through or getting caught in bypass conduit 115 by optional screens 177, which permit any desired proportion of water to pass through the bypass conduit.

EXAMPLE

An apparatus for facilitating fish migration according to FIG. 1 is provided with three gate valves as shown in FIG. 4. Head 108 is 13.7 meters, and conduit 101 is of circular cross section, with a 1000 millimeter nominal diameter (reference 223). Valves 102, 105, and 106 are provided with a plurality of holes to permit a desired flow-through rate and substantially uniform turbulence through the conduit when one or more of the valves is closed. The holes have a diameter "d" (ref. 222), and are substantially evenly spaced, as shown, to permit a desired flow rate Q and substantially uniformly turbulent flow according to the following:

| Desired Q | Flow-through hole diameter "d" | Number of holes |
|---|---|---|
| 500 liters/second | 35 millimeters | 161 |
| 600 liters/second | 35 millimeters | 193 |
| 750 liters/second | 35 millimeters | 242 |

Preferred embodiments of the invention are made of any materials having sufficient strength, durability, and resistance to fatigue and corrosion to accomplish the purposes disclosed herein in under any desired conditions. Steel and other metals are suitable, but any material, including concrete, plastics, or any other structural or suitable materials will serve.

With regard to systems and components above referred to, but not otherwise specified or described in detail herein, the workings and specifications of such systems and components and the manner in which they may be made or assembled or used, both cooperatively with each other and with the other elements of the invention described herein to effect the purposes herein disclosed, are all believed to be well within the knowledge of those skilled in the art. No concerted attempt to repeat here what is generally known to the artisan has therefore been made.

INDUSTRIAL APPLICABILITY

The invention provides improvements in devices for facilitating the migration of fish past dams and other water barriers. Improvements disclosed ease the passage of the fish, assuring that the fish arrive at their destination with less expenditure of energy and thus in better condition than was possible with prior art devices, with resultant benefits for reproduction and species perpetuation and exploitation. The invention also provides new and improved structures for such devices which permit more economical construction, installation, and operation of fish migration devices.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

We claim:

1. Apparatus for facilitating migration of fish past dams and other barriers in waterways, the apparatus comprising:
   a conduit passing from a downstream side of a water barrier to an upstream side of said barrier;
   a first flow controlling valve disposed within said conduit, said first valve adapted to provide a substantially uniformly turbulent flow within said conduit at a downstream side of said valve when open and a substantially decreased flow when closed;
   a second flow controlling valve disposed within said conduit, said second valve adapted to provide substantially uniform turbulent flow within said conduit when opened and a substantially decreased flow when closed; and
   first and second actuator means to open and close said first and second valves sequentially, so that a fish-holding zone is created between said valves and fish may sequentially pass through said first and then said second valve.

2. The apparatus of claim 1, further comprising at least one rest station disposed within said conduit, said rest station adapted to provide within said rest station a flow having a reduced average velocity in comparison to said flow within said conduit.

3. The apparatus of claim 1, wherein at least one of said valves is a gate valve.

4. The apparatus of claim 1, wherein at least one of said valves is a ball valve.

5. The apparatus of claim 1, further comprising at least one water bypass conduit to maintain a flow of water through said conduit when one of said valves is closed.

6. The apparatus of claim 1, wherein said valves comprise a plurality of holes adapted to provide said substantially uniformly turbulent flow at said downstream side of said valves.

7. The apparatus of claim 1, wherein said actuator opens said valve automatically.

8. The apparatus of claim 7, wherein said actuator is chosen from the group consisting of photocells, pressure gages, motion detectors, cameras, flow meters, and clocks.

9. The apparatus of claim 1, used in combination with a multi-pond fish ladder.

10. The apparatus of claim 1, the conduit having a length and said apparatus comprising at least one rest station disposed within said conduit for at least every 20 meters of said length.

11. The apparatus of claim 1, further comprising a shelter above an entrance to said conduit disposed on said downstream side of said water barrier.

12. Apparatus for facilitating migration of fish past dams and other barriers in waterways, the apparatus comprising:
   a plurality of conduits passing from a downstream side of a water barrier to an upstream side of said barrier;
   a first flow controlling gate valve disposed within each said conduit, said first valve adapted to provide a substantially uniformnly turbulent flow within said conduit at a downstream side of said valve when open and a substantially decreased flow when closed;
   a second flow controlling gate valve disposed within each said conduit said second valve adapted to provide substantially uniform turbulent flow within said conduit at a downstream side of said valve when opened and a substantially decreased flow when closed; and,
   first and second actuator means to open and close said first and second valves sequentially, so that a fish-holding zone is created between said valves and fish may sequentially pass through said first and then said second valve, said first and said second actuator means chosen from the group consisting of photocells, pressure gages, motion detectors, cameras, flow meters, and clocks.

13. Apparatus for facilitating migration of fish past dams and other barriers in waterways, the apparatus comprising:
   a conduit passing from a downstream side of a water barrier to an upstream side of said barrier;
   a first flow controlling ball valve disposed within said conduit, said first valve adapted to provide a substantially uniformly turbulent flow within said conduit at a downstream side of said valve when open and a substantially decreased flow when closed;
   a second flow controlling ball valve disposed within said conduit, said second valve adapted to provide substantially uniform turbulent flow within said conduit at a downstream side of said valve when opened and a substantially decreased flow when closed; and
   first and second actuator means to open and close said first and second valves sequentially, so that a fish-holding zone is created between said valves and fish may sequentially pass through said first and then said second valve, said first and said second actuator means chosen from the group consisting of photocells, pressure gages, motion detectors, cameras, flow meters, and clocks.

14. Apparatus for facilitating migration of fish past dams and other barriers in waterways, the apparatus comprising:
   a conduit passing from a downstream side of a water barrier to an upstream side of said barrier;
   a first flow controlling valve disposed within said conduit, said first valve adapted to provide a substantially uniformly turbulent flow within said conduit at a downstream side of said valve when open and a substantially decreased flow when closed;
   a second flow controlling valve disposed within said conduit, said second valve adapted to provide substantially uniform turbulent flow within said conduit when opened and a substantially decreased flow when closed;

first and second actuator means to open and close said first and second valves sequentially, so that a fish-holding zone is created between said valves and fish may sequentially pass through said first and then said second valve; and at least one rest station disposed within said conduit, said rest station adapted to provide within said rest station a flow having a reduced average velocity in comparison to said flow within said conduit.

15. The apparatus of claim 14, wherein said first and said second actuator means are chosen from the group consisting of photocells, pressure gages, motion detectors, cameras, flow meters, and clocks.

16. A method of facilitating migration of fish past dams and other barriers in waterways, the method comprising the steps of:

providing a flow of water from a downstream end of a conduit passing from a downstream side of a water barrier to an upstream side of said barrier, to attract fish into entering said conduit;

automatically opening a first flow controlling valve in said conduit to permit passage of at least one fish by said first valve, said first valve adapted to provide a substantially uniformly turbulent flow within said conduit at a downstream side of said valve when open and a substantially decreased flow when closed;

automatically closing said first valve; and opening a second flow controlling valve located in said conduit at a distance from said first valve, said second valve adapted to provide a substantially uniformly turbulent flow within said conduit at a downstream side of said valve when open and a substantially decreased flow when closed, to permit at least one fish to pass said second valve and continue through the conduit.

* * * * *